US012077425B2

(12) United States Patent
Tanchette et al.

(10) Patent No.: US 12,077,425 B2
(45) Date of Patent: Sep. 3, 2024

(54) LIQUID DISPENSER

(71) Applicant: SOCIÉTÉ ANONYME DES EAUX MINÉRALES D'EVIAN ET EN ABRÉGÉ "S.A.E.M.E", Évian-les-Bains (FR)

(72) Inventors: Jean-Baptiste Tanchette, Messery (FR); Catherine-Alix Drzewiecki, Jongny (CH); Vincent Loisel, Thollon les Memises (FR)

(73) Assignee: SOCIÉTÉ ANONYME DES EAUX MINÉRALES D'EVIAN ET EN ABRÉGÉ "S.A.E.M.E", Évian-les-Bains (FR)

( * ) Notice: Subject to any disclaimer, the term of this patent is extended or adjusted under 35 U.S.C. 154(b) by 408 days.

(21) Appl. No.: 17/268,876

(22) PCT Filed: Apr. 10, 2020

(86) PCT No.: PCT/EP2020/060342
§ 371 (c)(1),
(2) Date: Feb. 16, 2021

(87) PCT Pub. No.: WO2020/208240
PCT Pub. Date: Oct. 15, 2020

(65) Prior Publication Data

US 2022/0017346 A1 Jan. 20, 2022

(30) Foreign Application Priority Data

Apr. 12, 2019 (EP) .................................... 19305474

(51) Int. Cl.
*B67D 3/04* (2006.01)
*B67D 3/00* (2006.01)

(52) U.S. Cl.
CPC .......... *B67D 3/044* (2013.01); *B67D 3/0029* (2013.01); *B67D 2210/00028* (2013.01)

(58) Field of Classification Search
CPC .. B67D 1/0462; B67D 1/0001; B67D 3/0029; B67D 3/044
See application file for complete search history.

(56) References Cited

U.S. PATENT DOCUMENTS 1,911,076 A * 5/1933 Gandola ................ B67D 3/048 222/542
3,447,720 A 6/1969 Janigian et al.
(Continued)

FOREIGN PATENT DOCUMENTS

CN 1907841 A 2/2007
CN 101998924 A 3/2011
(Continued)

OTHER PUBLICATIONS

Foreign Communication from a Related Counterpart Application, International Search Report and Written Opinion dated May 28, 2020, International Application No. PCT/EP2020/060342 filed on Apr. 10, 2020.
(Continued)

*Primary Examiner* — Vishal Pancholi
(74) *Attorney, Agent, or Firm* — Conley Rose, P.C.

(57) ABSTRACT

System for dispensing a liquid to a user, comprising:
- a container,
- a liquid,
- a dispenser, arranged to receive and hold the container in a dispensing position, and comprising a control unit user,
- a valve connected to the container, and connected to the control unit to selectively release or stop a flow of the liquid out of the container, characterized in that:

(Continued)

upon releasing at least a part of the liquid, the container is deformable, the valve releasing a flow of the liquid out of the container, and upon releasing at least another part of the liquid, the valve releases a flow of liquid out of the container, and allows a flow of gas into the container.

19 Claims, 10 Drawing Sheets

(56) References Cited

U.S. PATENT DOCUMENTS

| | | | | |
|---|---|---|---|---|
| 5,647,416 | A | 7/1997 | Desrosiers et al. | |
| 9,828,166 | B2 * | 11/2017 | Bouffand | B65D 1/40 |
| 2004/0007589 | A1 * | 1/2004 | Leveen | B67D 1/0462 222/105 |
| 2007/0251955 | A1 * | 11/2007 | Green | B67D 3/0035 222/185.1 |
| 2008/0314930 | A1 * | 12/2008 | Green | B67D 3/0035 222/484 |
| 2010/0096040 | A1 * | 4/2010 | Litto | B67D 1/0462 141/285 |
| 2012/0055953 | A1 | 3/2012 | Shiotani et al. | |
| 2012/0211520 | A1 * | 8/2012 | Ciavarella | A47K 5/122 222/92 |
| 2015/0053716 | A1 * | 2/2015 | Meinzinger | B67D 1/0004 222/23 |
| 2015/0298957 | A1 | 10/2015 | Orita | |

FOREIGN PATENT DOCUMENTS

| | | | |
|---|---|---|---|
| CN | 103482169 | A | 1/2014 |
| CN | 103648964 | A | 3/2014 |
| DE | 20310783 | U1 | 12/2003 |
| EP | 0268451 | A2 | 5/1988 |
| EP | 2730535 | A1 | 5/2014 |
| EP | 2858043 | A1 | 4/2015 |
| FR | 2922146 | A1 | 4/2009 |
| GB | 1057957 | A | 2/1967 |
| JP | 2009001280 | A | 1/2009 |
| JP | 2009154920 | A | 7/2009 |
| JP | 2012101796 | A | 5/2012 |
| JP | 2013166560 | A | 8/2013 |
| JP | 2016504245 | A | 2/2016 |
| JP | 2019006404 | A | 1/2019 |
| WO | 2006005601 | A1 | 1/2006 |
| WO | 201007744 | A1 | 1/2010 |
| WO | 2014101956 | A1 | 7/2014 |
| WO | 2018212659 | A1 | 11/2018 |
| WO | 2020208240 | A1 | 10/2020 |

OTHER PUBLICATIONS

Foreign Communication from a Related Counterpart Application, Extended European Search Report dated Oct. 22, 2019, European Application No. 19305474.9 filed on Apr. 12, 2019.

Foreign Communication from a Related Counterpart Application, Japanese Office Action dated Oct. 5, 2023, Japanese Application No. 2021-505927 filed on Jan. 28, 2021.

Foreign Communication from a Related Counterpart Application, Second Chinese Office Action dated Nov. 17, 2023, Chinese Application No. 202080004274.1 filed on Apr. 10, 2020.

Foreign Communication from a Related Counterpart Application, Chinese Office Action dated Apr. 4, 2023, Chinese Application No. 202080004274.1 filed on Apr. 10, 2020.

* cited by examiner

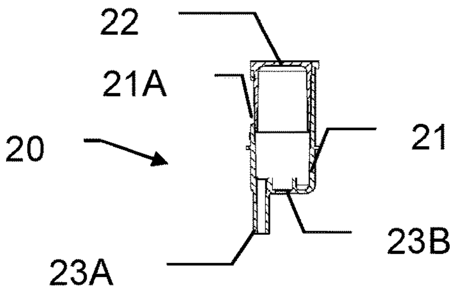
Fig. 3
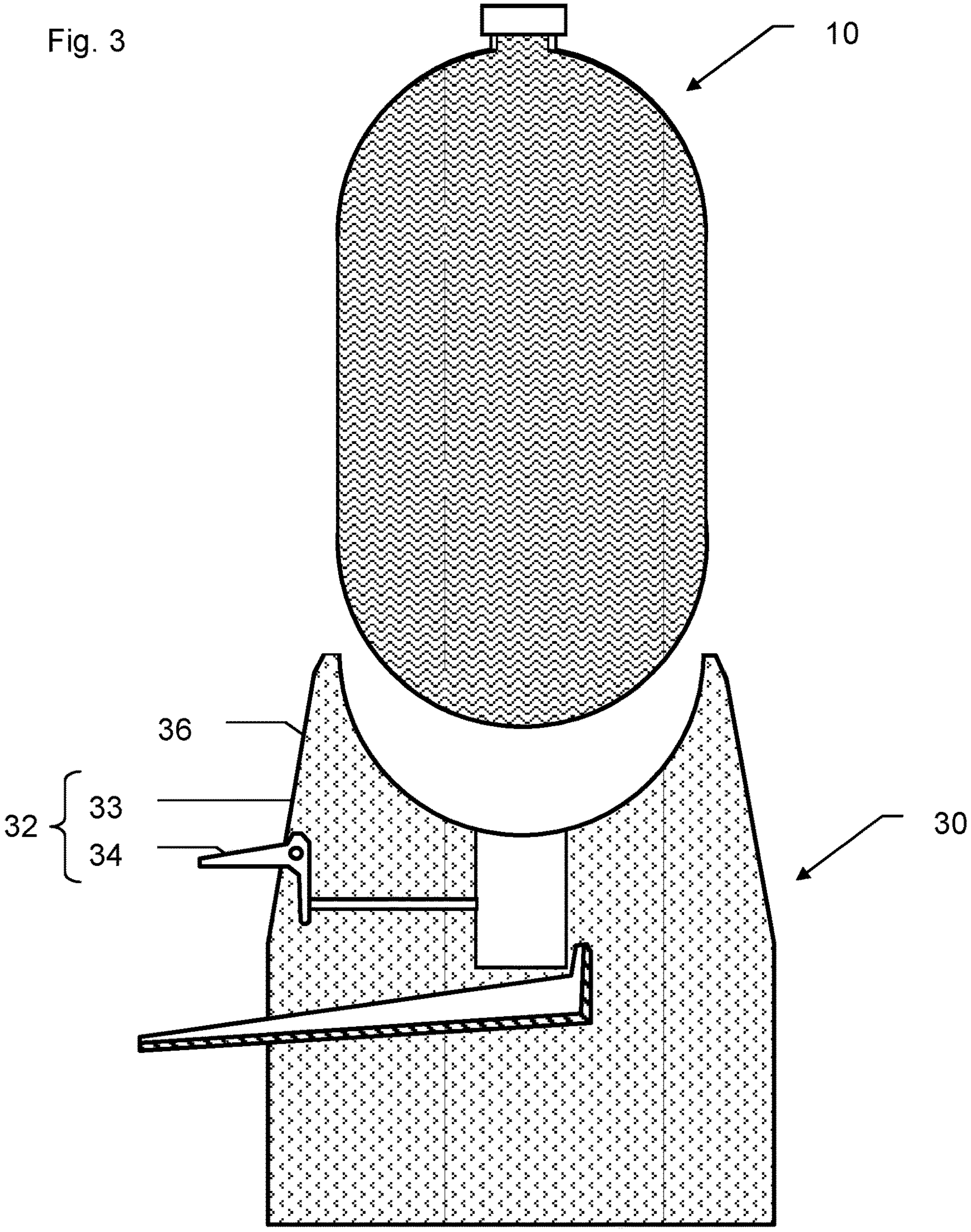

LIQUID DISPENSER

CROSS-REFERENCE TO RELATED APPLICATIONS

The present application is a filing under 35 U.S.C. 371 as the National Stage of International Application No. PCT/EP2020/060342, filed Apr. 10, 2020, entitled "LIQUID DISPENSER," which claims priority to European Application No. 19305474.9 filed with the European Patent Office on Apr. 12, 2019, both of which are incorporated herein by reference in their entirety for all purposes.

The present invention relates to a liquid dispenser, in particular to a liquid beverage dispenser and more particularly to a water dispenser. The invention relates to liquid dispensers, where the liquid is stored in a closed container before dispensing to a user.

Usual water dispensing systems comprise a thick container, that, once empty, has still a huge volume. To avoid waste of space, the user has to collapse the empty container, thus requiring extra effort to the user. Alternatively the container is retuned for being refilled, which requires a significant expensive specific logistic, that does not take advantage of existing general recycling streams for various materials. In summary the usual existing containers for dispensers are expensive and are not user friendly.

Documents CN103482169, WO201007744, FR2922146 and WO2014101956 describe water dispensing systems having a deformable container, and arranged to prevent any air entry. Such systems however do not allow a full draining of the water, resulting in water waste and/or in some spillage, unwanted by the user, when the container is changed.

Document EP 2 730 535 A1 discloses two categories of water dispensing systems. A first category is related to shrinkable bottles, compensating loss of liquid by a volume reduction. A second category is related to hard bottles, having constant shape during liquid distribution.

Document WO2006/005601 A1 discloses a drink dispenser (a valve) to be coupled to an inverted bottle, for delivering a predetermined volume of drink.

The present invention aims to address the above mentioned drawbacks of the prior art, and to propose first a dispenser where the liquid is stored in a container, which is more user friendly, optimizes the water yield, and/or decreases the amount of container material used.

In this aim, a first aspect of the invention relates to a system for dispensing a liquid to a user, comprising:

- a container having a reference container volume,
- a liquid, in the container, said liquid being in an amount of up to a liquid reference volume, the liquid reference volume being preferably of from 80% to 99% of the container reference volume
- a dispenser, arranged to receive and hold the container in a dispensing position, and comprising a control unit to be actuated by the user,
- a valve connected to the container, and connected to the control unit to selectively release or stop a flow of the liquid out of the container, characterized in that:

- upon releasing at least a part of the liquid, the container is deformable, the valve releasing a flow of the liquid out of the container when the control unit is actuated by the user, and
- upon releasing at least another part of the liquid, the valve releases a flow of liquid out of the container, and allows a flow of gas into the container when the control unit is actuated by the user.

According to the above embodiment, the valve is arranged to provide two distinct operating modes. In a first operating mode, there is mainly releasing/draining liquid out of the container. In this first operating mode, the container deforms to compensate the loss of volume caused by the release of liquid (the container deforms so that the container volume decreases to compensate at least 80%, or 90% or 99% or more preferably 100% of the liquid volume drained out of the container). In a second operating mode, there is releasing/draining liquid out of the container, and entry/admission of air into of the container to compensate most of the liquid volume drained out of the container). In this second operating mode, the container might deform to compensate a loss of volume caused by the release of liquid, but the container volume decreases less than 50% or 30% or even 20% of the liquid volume drained out of the container, thereby causing a (significant) entry/admission of air into the container. As a consequence of the container deformation, when fully drained from liquid, the container is in a collapsed state, reducing the space/volume to discard it and to ideally to recycle it. The handling of an empty container according to the present invention is easier. In addition, it is to be noted that the deformation of the container limits the entry of gas/air, so that the risk of potential contamination by the gas/air of the remaining liquid in the container is reduced. The freshness and/or the preservation of the liquid is thereby improved. The recommended liquid consumption expiration date after opening can thus be increased. Freshness and/or recommended liquid consumption expiration after opening can vary depending on the liquid. For waters the period of time can be of up to 15 days. For beverages comprising fruits or fruit extract and/or sugar and/or sweeteners, the period of time can be of up to 5 days, preferably up to 2 or 3 days.

It has to be noted that the first operating mode or second operating mode can continuously operate during at least draining liquid for filling a cup or glass, that is to say for draining out of the container a volume of liquid of at least 0.125 L, preferably at least 0.25 L, and more preferably at least 0.5 L.

In other words, the system is preferably arranged so that:

- during the first operating mode, to drain out of the container a volume of liquid of at least 0.125 L, preferably at least 0.25 L, and more preferably at least 0.5 L, the valve releases a flow of the liquid out of the container when the control unit is actuated by the user, and the container is deformable so that the container volume decreases by at least 80%, or 90% or 99% or more preferably 100% of the liquid volume drained out of the container,
- during a second operating mode, to drain out of the container a volume of liquid of at least 0,125 L, preferably at least 0.25 L, and more preferably at least 0.5 L, the valve releases a flow of the liquid out of the container when the control unit is actuated by the user, and the container is deformable by at most 50% or 30% or even 20% of the liquid volume drained out of the container, thereby causing an entry/admission of air into the container.

Typically, the transition between first operating mode to second operating mode occurs when at an air entry threshold comprised between 5% and 66%, preferably from 10% to 50%, preferably from 20% to 40% of the liquid reference volume.

It has to be noted that the system can be free of active pumping means.

Preferably only gravity causes the release of liquid out of the container, and the system does not comprise any pump.

In other words, in the first operating mode, the container is "auto" deformable, so as to compensate the loss of liquid, with limited or no entry of gas into the container.

The switch or transition from the first operating mode to the second operating mode is provided by the system itself: once the container has reached a given shrinkage or reduction of volume, the container wall resists to more shrinkage or reduction of volume and some gas/air is allowed to enter the container. In other words, the system is autonomous and passive: no external control/signal is necessary to provoke the entry of air. It is solely based on the deformation/shrinkage/reduction of volume of the container that the first operating mode is ended.

Rephrasing the above, the transition between first operating mode to second operating mode occurs when the deformed or actual container volume is below the air entry threshold, typically comprised between 5% and 66%, preferably from 10% to 50%, preferably from 20% to 40% of the liquid reference volume.

Advantageously:

- during a first dispensing phase, the container is deformable so that the valve releases a flow of liquid out of the container when the control unit is actuated by the user, preferentially, the container is deformable so as to compensate at least 80%, or 90% or 99% or more preferably 100% of the liquid volume drained out of the container
- during a second dispensing phase, the valve releases a flow of liquid out of the container, and, simultaneously or sequentially, allows a flow of gas into the container when the control unit is actuated by the user.

It is mentioned that during the second dispensing phase the flow of gas can be perceived visually or by sound by the user. This perception can trigger an action to change the container, or an order for a new filled container, or to start a period of time, for freshness time or recommended liquid consumption expiration threshold.

Advantageously, the container comprises a wall, and:

- during a first dispensing phase, the container wall is deformable and/or deformed, under atmospheric pressure so that an internal container liquid pressure, optionally together with the container own resistance, equilibrates with the atmospheric pressure, preferably, the internal container liquid pressure is at least 90%, more preferably 95% of atmospheric pressure
- during a second dispensing phase, the container wall is less or not deformable and/or deformed, under atmospheric pressure so that an internal container liquid pressure, optionally together with the container own resistance, is smaller than the atmospheric pressure.

Advantageously, the container comprises a wall comprising a bottom portion, a side portion, and a shoulder portion, and a neck provided on the shoulder portion opposite to the bottom portion, wherein the side portion comprises a straight part, so that the side portion presents a cylindrical shape. Alternatively, the side portion can be slightly convex.

Advantageously, the container wall is free of ridge, rib, or groove. In other words, the container wall is smooth, so that deformation during liquid dispensing is facilitated. In addition, if the user wants to fully collapse an empty container, this will require less effort, and handling will be less difficult.

Advantageously, the bottom portion and/or the shoulder portion present a hemispherical shape, and the side portion is cylindrical, preferably a circular cylinder. Containers with such hemispherical shapes and straight or slightly convex side portions are particularly visually attractive and/or otherwise visually differentiating for consumers. Besides these features have been found to allow some manufacturing and/or usage advantages detailed below.

Advantageously, the valve is arranged to allow a flow of liquid out of the container:

- of from 0.020 L/s to less than 0.028 L/s or from 0.028 L/s to 0.150 L/s, preferably from 0.042 L/s to 0.083 L/s as an average for fully draining the liquid out of the container, and preferably:
  - of from 0.030 L/s to less than 0.042 L/s or from 0.042 L/S to 0.150 L/s, preferably from 0.060 L/s to 0.150 L/s as an average when the valve allows only a flow of liquid out of the container, and/or
  - of from 0.020 L/s to less than 0.028 L/s or from 0.028 L/s to 0.083 L/s, preferably from 0.028 L/s to 0.050 L/s as an average when the valve allows a flow of liquid (40) out of the container and a flow of air into the container.

Advantageously, the container is a blow molded container, preferably an injection blow molded container.

Advantageously:

- when the liquid volume is comprised in a range of an air entry threshold to 100% of the liquid reference volume, the valve is arranged to only release, in a first dispensing phase, a flow of liquid out of the container when the control unit is actuated by the user; and
- when the liquid volume is comprised in a range of from 0% to an air entry threshold of the liquid reference volume, the valve is arranged to release, in a second dispensing phase, a flow of liquid out of the container, and to allow a flow of gas into the container when the control unit is actuated by the user
- wherein the air entry threshold is comprised between 5% and 66%, preferably from 10% to 50%, preferably from 20% to 40% of the liquid reference volume.

In other words, the invention relates to a system for dispensing a liquid to a user, comprising:

- a container having a reference container volume,
- a liquid, preferably a liquid, in the container, said liquid being in an amount of up to a liquid reference volume, the liquid reference volume being preferably of from 80% to 99% of the container reference volume
- a dispenser, arranged to receive and hold the container in a dispensing position, and comprising a control unit to be actuated by the user,
- a valve connected to the container, and connected to the control unit to selectively release or stop a flow of the liquid out of the container,
- characterized in that:
- in a first operating mode (e.g. when the liquid volume is comprised in a range of an air entry threshold to 100% of the liquid reference volume), the valve is arranged to only release a flow of liquid out of the container when the control unit is actuated by the user; and
- in a second operating mode (e.g. when the liquid volume is comprised in a range of from 0% to an air entry threshold of the liquid reference volume), the valve is arranged to release a flow of liquid out of the container, and to allow a flow of gas into the container when the control unit is actuated by the user.

Advantageously, the valve is arranged to be realisably coupled to the container. In other words, the container, when delivered to the user is sealed for example with a regular cap or lid. The user has to first break this seal, for example by removing or piercing the cap or lid, to then connect the valve to the container, and then install this assembly into the dispenser.

Advantageously, the valve is arranged to be connected, preferably realisably, to the control unit. The valve can be of any kind, comprising one of several mechanical shutter, allowing releasing a flow of the liquid out of the container and allowing a flow of gas into the container, in various stages and/or with various control actions via the control unit.

Advantageously:

- the valve comprises an elastic element arranged to rest into a nominal position, so as to seal the container,
- the control unit comprises a control member arranged to deflect the elastic element from its nominal position, so as to release at least the flow of liquid out of the container.

Advantageously, the control member is moveable between:

- a rest position into which the elastic element is in its nominal position,
- an actuated position into which the elastic element is deflected from its nominal position, wherein the control member is arranged so that in its rest position, it defines a predetermined gap with the valve coupled to the container, so as to allow removal from the dispensing base of the container coupled to the valve.

Advantageously, the valve is arranged so that the elastic element is pushed into its nominal position under a force generated by the liquid pressure.

Advantageously:

- the container comprises a wall comprising a bottom portion, a side portion, and a shoulder portion, and a neck provided on the shoulder portion opposite to the bottom portion, and
- the dispenser comprises a receiving portion arranged to mate with the shoulder portion so as to stably receive and hold the container in a dispensing position,
- wherein the bottom portion has a similar shape than the shoulder portion so that the receiving portion can stably receive and hold the container in an upright position. According to the above embodiment, the dispenser can receive the container in an upright position, for example to unseal the container fully filled with liquid so as to install the valve. The unsealing be performed for example by removing or piercing a cap or lid. This facilitates the handling for the user, as the receiving portion can provide stable rest position, even if the container is extra light, thin and highly deformable.

Advantageously, the bottom portion and the shoulder portion present a hemispherical shape. In other words, with exception to the neck, the container is symmetrical. Beyond the attractivity or differentiation mentioned above such hemispherical shape provides stable mating between the container and dispenser, to avoid any unexpected deformation when the user opens a filled container to couple the valve. Finally, it has to be noted that such hemispherical shape provided in bottom and shoulder is well suited to be obtained with an injection blow molding process of polyethylene terephthalate.

Advantageously, the system further comprises an electronic control unit, arranged to display or send at least one information or instruction message to the user or to treatment entity. Preferably, the electronic control unit is provided in the dispenser, but might also be (partially) provided with an electronic portable apparatus, such as a smartphone or watch.

Advantageously, the system further comprises a liquid content measurement unit.

Advantageously, the liquid content measurement unit is a weighting unit arranged to weight the liquid in the container and connected to the electronic unit, and the electronic unit is arranged to display or send an information or instruction message based on a container weight measured by the weighting unit.

Advantageously, the message is a reminder to order at least one filled container, or an order for at least one filled container, generated when the liquid content measured by the liquid content measurement unit is below a liquid threshold.

Advantageously, the system comprises:

- a clock connected to the electronic unit,
- a container presence sensor,
- and wherein the message is a reminder to change the container, or an order for a new filled container, when a period of time, started when the container presence sensor has changed of state to detect installation of a container, is exceeding a freshness time or recommended liquid consumption expiration threshold. According to the above mentioned embodiment, the user is informed about the freshness and/or the liquid consumption expiration threshold of the liquid stored in the container, and invited to replace the container if it has been installed and/or if gas/air has been present for a long time, and even if it is not empty.

Advantageously, the message is a reminder to change the container, when a second period of time, started when the container weight has been measured below the weight threshold, is exceeding a gas in container time or recommended liquid consumption expiration threshold. According to the above mentioned embodiment, the user is informed about the freshness or recommended liquid consumption expiration of the liquid stored in the container, determined on the basis of the presence of air into the container. Indeed, in the first operating mode, there is no or low gas entry into the container, so that the risk of contamination is low. However, in the second operating mode, more gas or air is allowed to enter into the container, so that there might be a higher risk of contamination or pollution. Therefore, the replacement of the container is sent earlier when the second operating mode has occurred. It is mentioned that the second period of time can be determined by the weighting unit, by using a given air entry weight, or by computing flow rate of the liquid. The flow rate in the first phase is typically higher than the flow rate in the second phase.

Advantageously, the at least one message comprises follow up of liquid consumption. The user is informed about the consumption, to check that he consumed enough per day for instance.

Advantageously, the system comprises at least one container kind recognition sensor, and wherein the electronic control unit is arranged to inhibit the sending of any message, if the container kind recognition sensor fails to recognize an authorized kind of container. Safety of use is increased, and messages might even be adapted to the kind of container detected.

Advantageously, said at least one container kind recognition sensor:

comprises a RFID receiver and a RFID tag, and/or comprises a code reader, and/or comprises a mechanical sensing touch, arranged to be actuated by a specific portion of the container.

Advantageously, the liquid is a beverage, preferably water, preferably still water.

A second aspect of the invention relates to a method for dispensing a liquid, with the system, comprising the steps of:

providing a sealed container having a container reference volume and filled with a liquid at a liquid reference volume being from 80% to 99% of the container reference volume, breaking the seal of the container, connecting a valve to the container, coupling the container equipped with the valve to a dispenser, so as to connect the valve to a control unit of the dispenser.

Advantageously, the method further comprises the steps of:

actuating the control unit so as to selectively release or stop a flow of the liquid out of the container, and upon releasing at least a part of the liquid, deforming the container, so that the valve releases a flow of the liquid out of the container when the control unit is actuated by the user, and upon releasing at least another part of the liquid, the valve releases a flow of liquid out of the container, and, preferably simultaneously, allows a flow of gas into the container when the control unit is actuated by the user.

Advantageously:

during a first dispensing phase, the container is deformable so that the valve only releases a flow of liquid out of the container when the control unit is actuated by the user;

during a second dispensing phase, the valve releases a flow of liquid out of the container, and, preferably simultaneously, allows a flow of gas into the container when the control unit is actuated by the user.

Advantageously, the method comprises:

before breaking the seal of the container, a step of placing the container in an upright position, preferably in the dispenser, and before coupling the container equipped with the valve to the dispenser, a step of turning over the container equipped with the valve.

Advantageously elements or components of the dispenser and/or of the valve, that come to be in contact with the liquid, or that cover such elements or components are detachable or dismountable by the user, preferably without using specific tools such as screw drivers or the like. Examples of such elements or components include the control unit or parts thereof as well as pipes, canals or other tap or spout elements. This enables an easy cleaning of such elements or components, appropriate to avoid any long-term contaminations such as biofilms of the like. This believed especially relevant for waters liquids for which purity is perceived as a key benefit by some consumers.

It is to be understood that all the above embodiments can be combined, provided they are technically compatible.

Other features and advantages of the present invention will appear more clearly from the following detailed description of particular non-limitative examples of the invention, illustrated by the appended drawings where:

FIG. 3 represents a system of the present invention, comprising the container of FIG. 1, filled with liquid and received in the dispenser of FIG. 2 in an upright position, and a valve to connect to the container;

Figure 1:
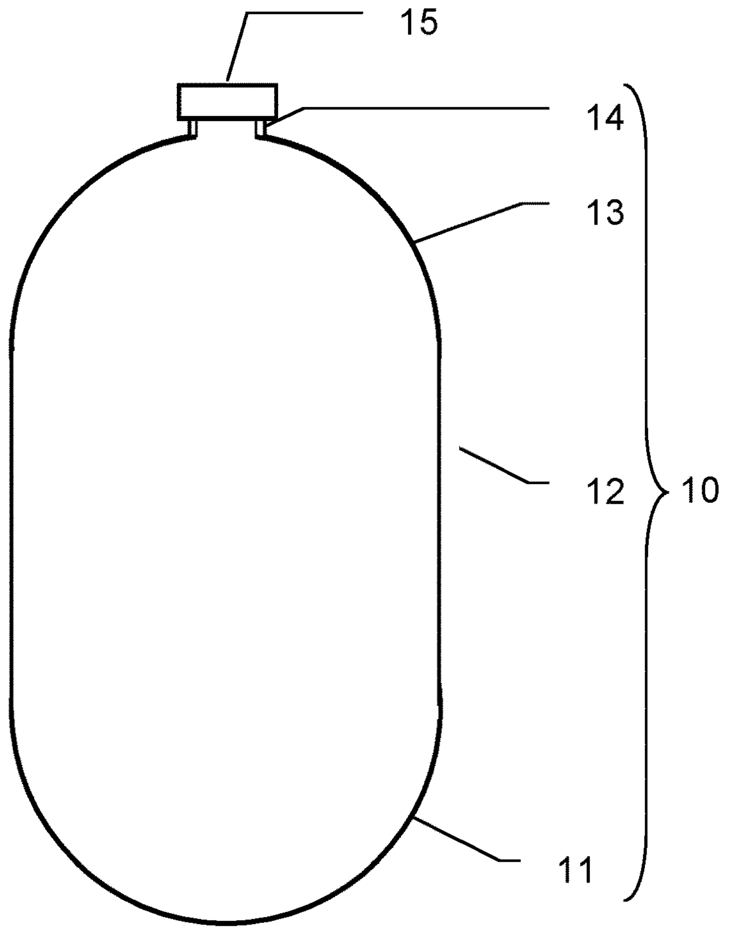
FIG. 1 represents a container for a system according to the present invention.

FIG. 1 represents a container 10 according to the present invention. Container 10 is designed to contain a liquid, preferably a drinkable liquid, such as water. The container 10 is typically made of a plastic material. The plastic material and the container structural features, such as the thickness and the shape, are such that the container has at least a deformable, flexible, part when it is empty.

Liquids

The liquid, comprised in the container, and to be released out of the container is preferably a drinkable, potable, liquid. Examples of such liquids include waters and beverages.

Examples of waters include tap water, purified and/or sterilized waters, such as distillated waters, well waters, spring waters, and mineral waters. The waters can be supplemented with some additives such as salts, minerals, electrolytes. The waters can be supplemented with some functional additives such as vitamins. The waters can be acidic, neutral or alkaline waters. The waters can be still waters or sparkling waters, for example carbonated, for example naturally carbonated, artificially carbonated or partially naturally carbonated.

Examples of beverages include alcoholic or non-alcoholic beverages, flavoured waters, aquadrinks, optionally flavoured milks, for example milks from animal origin such as cow milk or vegetal substitutes such as soy milk, almond milk, cashew milk, oat milk, rice milk, coconut milk, fermented beverages such as drinking yogurts or vegetal substitutes, kefirs, kombuchas, infused beverages, ready to use coffees, ready to use teas, ready to use creamers, fruit juices or nectars, carbonated soft drinks such as colas or sodas. The non-alcoholic beverages can for example comprise sugar, sweeteners and/or fruit or vegetable or their extracts.

Container Material and Structural Features

Examples of plastic materials suitable for the container include recyclable polyesters, such as PolyEthylene Terephtalate (PET), PolyTrimethylene Terephtalate (PTT), PolyEthylene 2,5-Furandicarboxylate (PEF), PolyTrimethylene 2,5-Furandicarboxylate (PTF). PET and rPET are for example available in various grades or compositions, for example packaging grades or compositions, for example bottles grades or compositions. PET is especially appropriate for waters. Waters are very sensitive to taste modification, and PET has been found not to alter the waters' taste over storage periods of at least 3 months, preferably at least 6 months, preferably at least 12 months, preferably at least 24 months.

The plastic material is preferably recyclable, for example by a mechanical route, a chemical route and/or a microbiological route. PET is recyclable by such routes. The plastic material is preferably at least partly recycled. The plastic material can for example be a 100% recycled material, or comprise an amount of R % by weight of recycled material and an amount of 100-R % of a virgin material, preferably of the same material as the recycled material, wherein R can be of at least 10% or at least 20% or at least 30% or at least 40% or at least 50% or at least 60% or at least 70%, or at least 80%, or at least 90%. The PET can for example be a 100% recycled PET (rPET), or comprise an amount of R % by weight of rPET and an amount of 100-R % of a virgin PET, wherein R can be of at least 10% or at least 20% or at least 30% or at least 40% or at least 50% or at least 60% or at least 70%, or at least 80%, or at least 90%.

The recycling is preferably a post-consumer (PC) recycling, where the container is recycled from waste streams after use by a consumer and disposal by a user or consumer. The rPET can be a PC rPET. The recycling typically involves sorting waste streams, to recover a stream of the selected material, and processing the stream with steps such as refining, washing and/or grinding. For example, PET can be sorted from waste streams, and then processed according to various routes. The mechanical route involves refining, washing and/or grinding to recover a rPET polymer. The recovered rPET polymer can be subjected to a solid state polymerization to re-increase its molecular weight, for example to re-increase its Intrinsic Viscosity (IV). The chemical route involves depolymerizing to recover monomers. The monomers can be re-polymerized to obtain a recycled fresh polymer. For example, PET or rPET can be depolymerized by hydrolysis, methanolysis, glycloysis, ammonolysis or aminolysis to obtain recycled terephthalic acid or a diester thereof and recycled monoethylene glycol. The recycled terephthalic acid or diester and/or the recycled monoethylene glycol can be repolymerized, optionally with adding some virgin terephthalic acid or diester and/or the monoethylene glycol. Similarly, the microbiological route involves treating the stream of material by micro-organisms to obtain de-polymerized oligomers or monomers, and then repolymerizing said monomers or oligomers, optionally with adding some virgin monomers or oligomers.

The container can be formed from the plastic material by a molding process, such as a blow molding process, for example an Extrusion Blow Molding process or an Injection Blow Molding process, for example an Injection Stretch Blow Molding process. Injection (Stretch) Blow Molding processes are especially suitable for PET materials. They involve forming a PET preform by injection, heating the preform, placing the preform in a mold, and blowing a gaz, usually air, in the heated preform to blow the material in the mold and conform the material with the mold. Upon blowing the PET stretches, becomes thinner, and gets resistance by strain hardening and/or strain induced crystallization phenomenon(s). Such processes are well known. Equipments and materials, virgin or recycled, are commercially available.

The preform can be a monolayer preform, to obtain a monolayer container. For example, the preform is a monolayer PET. For example, the container can be a monolayer PET container. The preform can be multilayer preform, to obtain multilayer container. For example, the preform can have a layer of virgin PET and a layer of rPET, preferably as an external at least partial layer. For example, the container can have a layer of virgin PET and a layer of rPET, preferably as an external at least partial layer.

The container has a reference volume, defined as the maximum volume when the container is not deformed. This is the state shown on FIG. 1.

The container reference volume can be of at least 3.0 L, preferably at least 4.0 L, preferably at least 5.0 L. The container can have a reference volume of at most 22.0 L, preferably at most 11.0 L. The container can have a reference volume of from 3.0 to 4.4 L or from 4.0 to 5.5 L, or from 5.0 to 6.6 L, or from 6.0 to 7.7 L, or from 7.0 to 8.8 L, or from 8.0 to 9.9 L, or from 9.0 L to 10.0 L. For example, the container shown on the figures has reference volume of from 4.9 L to 5.2 L.

The container is typically filled with a reference volume of the liquid, and sealed. The liquid reference volume is the maximum amount of liquid comprised in the container, before release. The liquid reference volume is typically slightly lower than the container reference volume, as the filled and closed container typically presents a head space (part or the container that is not filled). The head space is preferably of from 0% to 10% of the liquid reference volume, for example from 1% to 10% or from 1% to 5%. The liquid reference volume can be of from of at least 3.0 L, preferably at least 4.0 L, preferably at least 5.0 L. The liquid reference volume can be of at most 20.0 L, preferably at most 10.0 L. The liquid reference volume can be of from 3.0 to 4.0 L or from 4.0 to 5.0 L, or from 5.0 to 6.0 L, or from 6.0 to 7.0 L, or from 7.0 to 8.0 L, or from 8.0 to 9.0 L, or from 9.0 L to 10.0 L, or from 10.0 to 15.0 L, or from 15.0 to 20.0 L. For example, the liquid reference volume can be of from 4.9 L to 5.1 L.

The filled container, before use, is typically sealed by a closure. The closure can be any type of closure, for example a cap or a flexible lid. The closure can be for example a threaded cap or a snap cap. The container can be opened by removing the closure or by at least partially piercing the closure.

The container is a thin wall container, having a body and an opening, for example a neck. The body can have a wall comprising a bottom portion, a side portion, and a shoulder portion. The opening can be a neck provided on the shoulder portion opposite to the bottom portion. To allow the deformation, and to allow plastic saving, the body has a low average thickness on at least a portion, preferably at least a portion representing at least 50% of length or surface of the body, preferably at least 80%, preferably all the body. The bottom and/or the shoulder can present higher average thicknesses, up to 100% more than the average thickness of the rest of the body. The average thickness of the body can be for example of from 30 μm to 200 μm, preferably from 50 μm to 150 μm, for example from 50 μm to 75 μm or from 75 μm to 100 μm or from 100 μm to 125 μm or from 125 μm to 150 μm.

The thickness of the blown container can be managed by adapting, for a given container reference volume, the preform, in particular its shape and wall thickness, and by adapting the stretching parameters. It is mentioned that the geometry of the preform, such as its length, its diameter, and its bottom shape, determine, together with the neck, the weight of the preform and thus the weight of the container. The stretching can be described by the following parameters:

Axial Stretch ratio (ratio between length of container under neck and the length of the preform under neck)

Hoop Stretch ratio (ratio between the diameter of container and the diameter of the preform, at half length)

Planar Stretch ratio: Axial Stretch Ratio X Hoop Stretch Ratio.

The planar stretch ratio can be for example of from 12.0 to 27.0, preferably from 15.0 to 20.0. The axial stretch ratio can be for example of from 3.0 to 4.5, preferably from 3.3 to 4.0. The hoop stretch ratio can be for example of from 4.0 to 6.0, preferably from 4.5 to 5.5.

The container can present a packaging efficacy, determined as ratio between the container weight and the liquid reference volume, of from 5.27 g/L to 9.33 g/L, preferably of from 5.27 g/L to 7.33 g/L, preferably from 5.80 g/L to 7.00 g/L.

The container can present a surface density, determined as the ratio between the surface of the body and the container weight, of from 100 to 200 g/$m^2$.

Such extra light containers require less raw material, are cheap, and present an increased capacity to collapse during the dispensing of fluid.

Advantageously, the container when filled with the liquid reference volume and sealed presents a top load resistance of at least 10 daN for at least 5 mm deformation and/or a lateral load resistance of at least 5 daN for at least 2.5 mm deformation.

Referring now to the geometry of the container 10, it is provided with a bottom portion 11, a side portion 12, a shoulder portion 13, and a neck portion 14.

The neck portion 14 is designed to receive a closure, and in the present case of FIG. 1, the closure is a cap 15, screwed onto the neck portion 14. However, other seals are possible, such as cap in snap fit engagement, or a thermosealed lid.

The side portion 12 comprises a straight portion, that is to say that the side portion presents a cylindrical shape, and preferably a circular cylindrical shape. The thickness of the side portion 12 is sufficiently low to allow the deformation. For example for a PET container, the average thickness of the side portion can be of from 30 μm to 200 μm, preferably from 50 μm to 150 μm, for example from 50 μm to 75 μm or from 75 μm to 100 μm or from 100 μm to 125 μm or from 125 μm to 150 μm. Also, the side portion is free of ridge, edge, groove, or rib. As will be detailed hereunder, such a thin and smooth side portion 12 is easily deformable.

Referring to the bottom portion 11, it presents a hemispheric shape, and its thickness can be, for example for a PET container, of from 105 μm to 275 μm, preferably from 125 μm to 225 μm, for example for example from 125 μm to 150 μm or from 150 μm to 175 μm or from 175 μm to 200 μm or from 200 μm to 225 μm. Also, the bottom portion 11 is free of ridge, edge, groove, or rib. As will be detailed hereunder, such a thin and smooth bottom portion 11 is easily deformable.

Referring to the shoulder portion 13, it presents a hemispheric shape, and its thickness can be, for example for a PET container, of from 105 μm to 275 μm, preferably from 125 μm to 225 μm, for example for example from 125 μm to 150 μm or from 150 μm to 175 μm or from 175 μm to 200 μm or from 200 μm to 225 μm. Also, the shoulder portion 13 is free of ridge, edge, groove, or rib. As will be detailed hereunder, such a thin and smooth shoulder portion 13 is easily deformable.

Advantageously, the bottom portion 11 and shoulder portion 13 present similar shape, and preferably, the bottom portion 11 and shoulder portion 13 present the same hemispheric shape. Consequently, when considering that the side portion 12 is a circular cylinder, the container 10 is symmetrical (except for the neck portion 14), and can be received equally in an upright or upside-down position in a device having a hemispherical counterpart. In addition, such a shape provides an easier process of manufacturing, as being close to the natural shape upon blowing before, with low constrains upon conforming with the mold, during a blow molding process.

Dispenser and Dispensing

Figure 2:
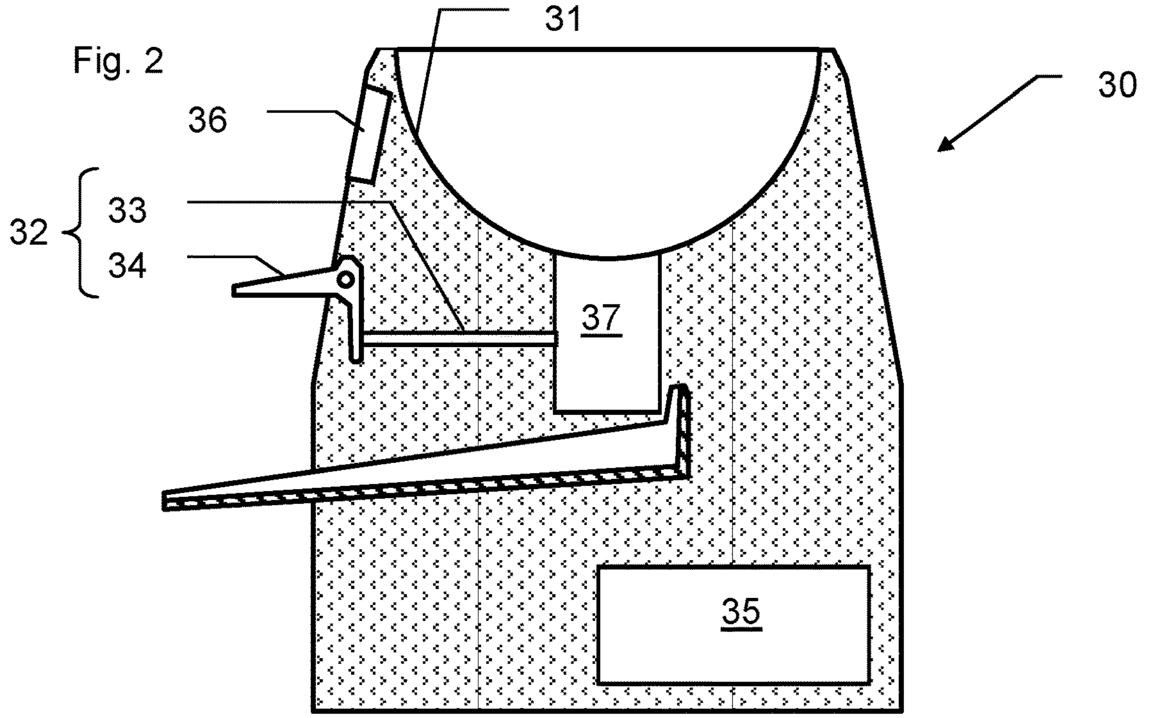
FIG. 2 represents a dispenser for a system according to the present invention.

FIG. 2 represents a dispenser 30 for the system of the present invention. The dispenser 30 is arranged to receive and hold the container 10 of FIG. 1. In particular, the dispenser 30 comprises a receiving portion 31, having a hemispheric shape similar to that of the bottom portion 11 and shoulder portion 13 of the container 10.

The dispenser 30 also comprises a control unit 32 notably comprising a shaft 33 and a lever 34 for manual actuation of dispensing by a user, as will be explained hereunder. The bottom part of the receiving portion 31 presents a recess 37, where the shaft 33 can access. Despite being not shown, the control unit 32 also comprises elastic means for automatic positioning of the lever 34 into the rest position shown on FIG. 2. In some embodiments, the control unit might also comprise electric actuators to perform some functions that will be detailed hereunder.

The dispenser main components, such as the receiving portion 31, casings or housings, can be made of various materials such as plastics. They might comprise some decorative parts made of another material, such as wood, metals, stones, different plastics or plastic with different colors or surfaces. In an embodiment, not shown, the dispenser comprise means to anchor or stabilize it on a support. In an embodiment the dispenser comprise a counterweight element, for example in metal, stone, sand or liquid, to stabilize it versus the weight of the filled, typically high, container.

In some embodiments, the dispenser might also comprise an electronic unit 35, to measure a content of liquid into the container 10, a screen 36 to send or display information to the user, a communication unit, to provide exchange of data between a remote server (via radio waves, internet, . . . ) or to a portable device, such as a smartphone or watch of the user.

FIG. 3 represents a system according to the invention, comprising the container 10 of FIG. 1, filled with a liquid 40 (still water for example), the dispenser 30 of FIG. 2, and a valve 20 to be connected to the container 10.

As already explained, the dispenser 30 is arranged to receive and hold the container 10 of FIG. 1. The container 10 as represented in this FIG. 3 has a container reference volume (for example 5 liters), and is fully or almost fully filled with a liquid 40 having a liquid reference volume, and liquid 40 is for example sill water. Preferably, the liquid reference volume is at least 90% of the container reference volume, and more preferably at least 95% of the container reference volume.

In particular, the dispenser 30 comprises a receiving portion 31, having an hemispheric shape similar to that of the bottom portion 11 and shoulder portion 13 of the container 10. Consequently, the container 10 might be received and held into an upright position by the dispenser, as shown FIG. 4, or in an upside down position, as shown FIG. 5.

The valve 20 is designed to be coupled to the container 10 via its neck portion 14. Basically, the valve 20 comprises a valve housing 21, which receives a flexible member being an elastic cup 22 in the present embodiment. The valve housing 21 has an outlet or a side window 21A through which the elastic cup can be accessed, a first end designed to mate with the neck portion 14, for example by a screw filet, and comprising a wall with two holes: an second inlet 23B and a first inlet 23A, having functions explained hereunder. The valve structure is shown and discussed in detail in FIGS. 11 to 13.

Figure 4:
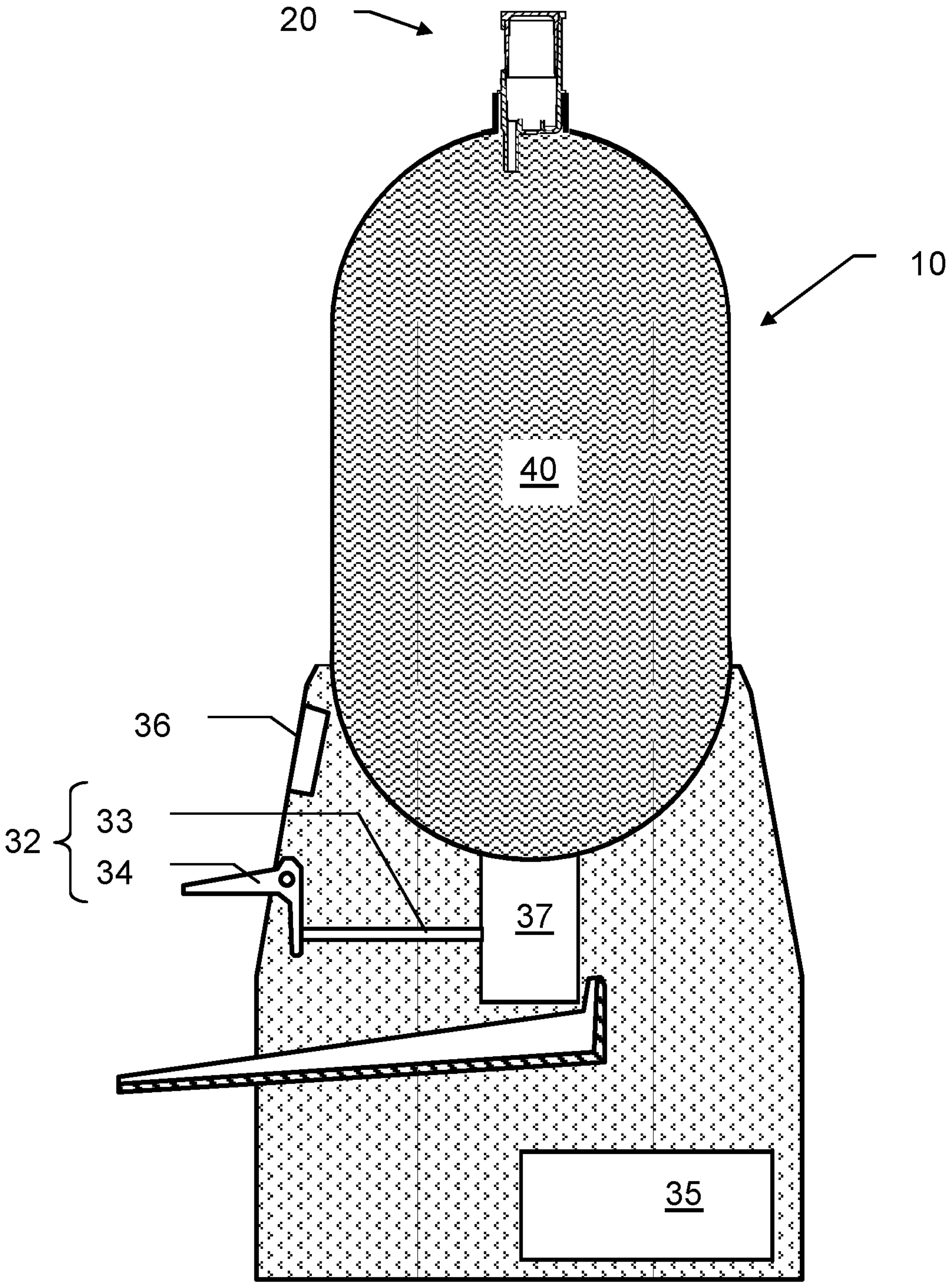
FIG. 4 represents the system of FIG. 3, with the valve coupled to the container.

FIG. 4 represents the container 10 stably received by the dispenser 30, in an upright position, so that a user can easily remove the seal cap 15 and install the valve 20, as shown.

Figure 5:
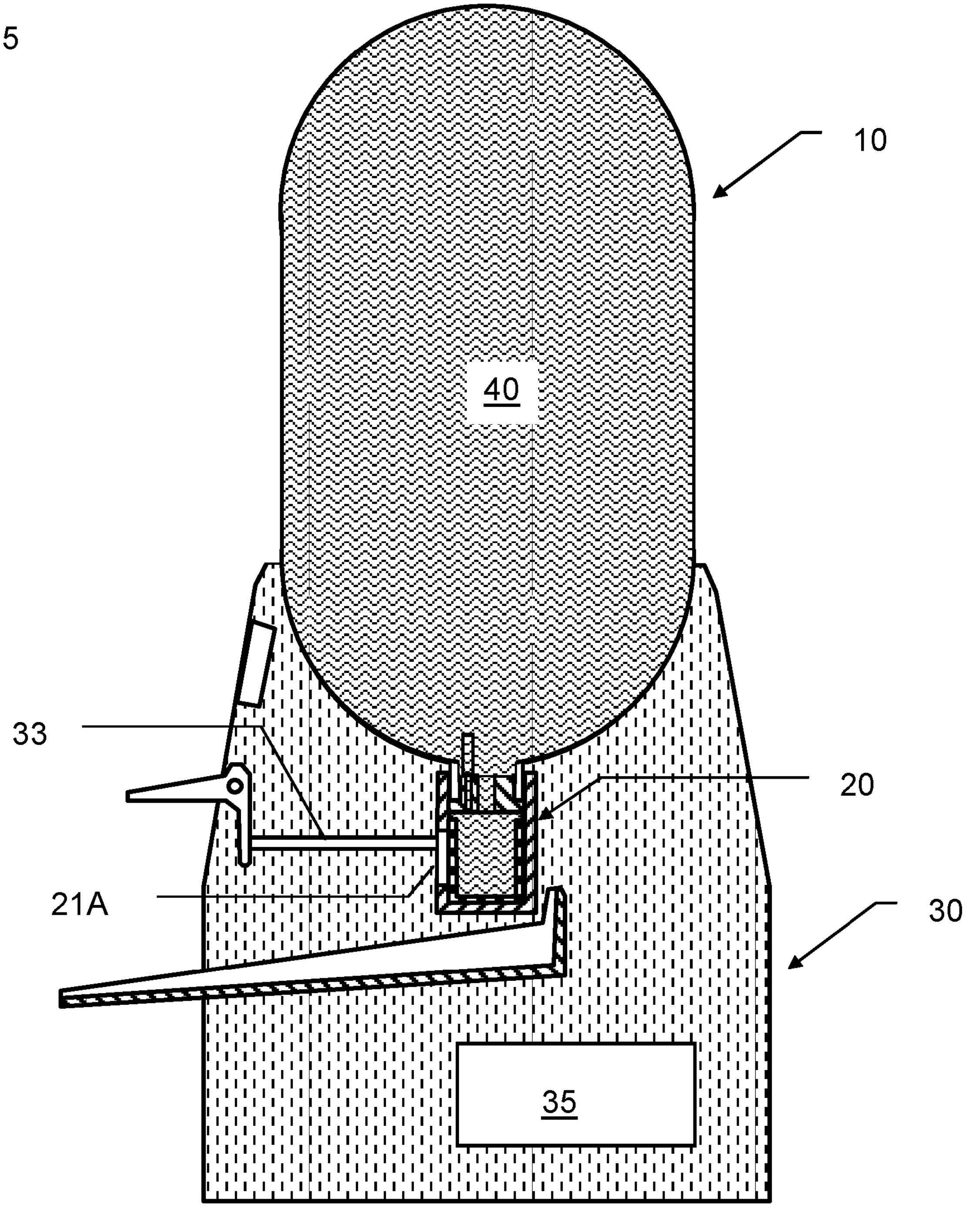
FIG. 5 represents the system of FIG. 4, with the container coupled to the valve, in an upside-down position, and coupled to the dispenser.

FIG. 5 shows the container 10 in an upside-down position, held in the receiving portion 31 of the dispenser 30, the valve 20 being received in the recess 37 of the dispenser 30. In that position, the shaft 33 faces the side window 21A of the valve 20.

Figure 6:
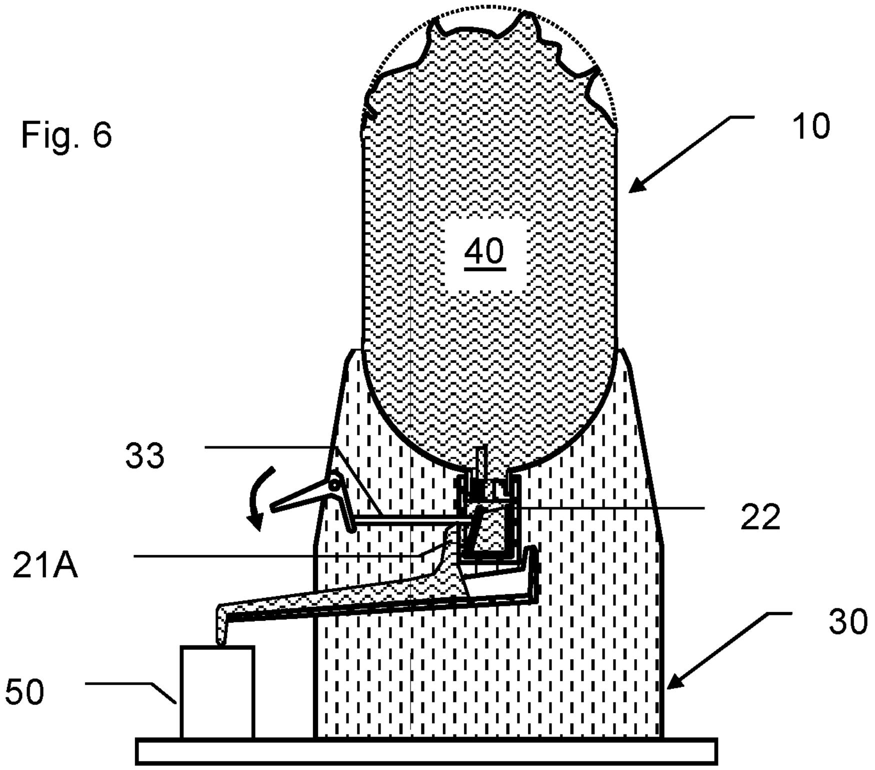
FIGS. 6 to 9 represent the system of FIG. 5, at different moments of draining liquid out of the container.

Consequently, and as shown on FIG. 6, when the user pushes the lever 34, the shaft 33 moves towards the valve 20 and goes through the side window 21A, so as to push and deflect the elastic cup 22, releasing the liquid 40 out of the container 10, which is dispensed into a cup 50, as shown.

Reverting to the container 10, and as explained above, one of its characteristics is its thin thickness. Consequently, the container 10 can easily deform when some liquid 40 is released out of the container 10. In addition, the valve inlets 23A and 23B are designed so that during the dispensing phase shown on FIG. 6, only liquid 40 is released out of the container 10, and no or very few gas or air is allowed to enter the container 10, the latter thereby deforming to fully or almost fully compensate the loss of liquid.

Such dispensing phase, with no or very limited entry of air into the container 10, minimizes any risk that the liquid 40 be polluted or contaminated with any external component. Therefore, the freshness and storage life time are longer compared to the case if some external air would be allowed to enter the container 10 since the beginning of dispense of liquid 40.

Figure 7:
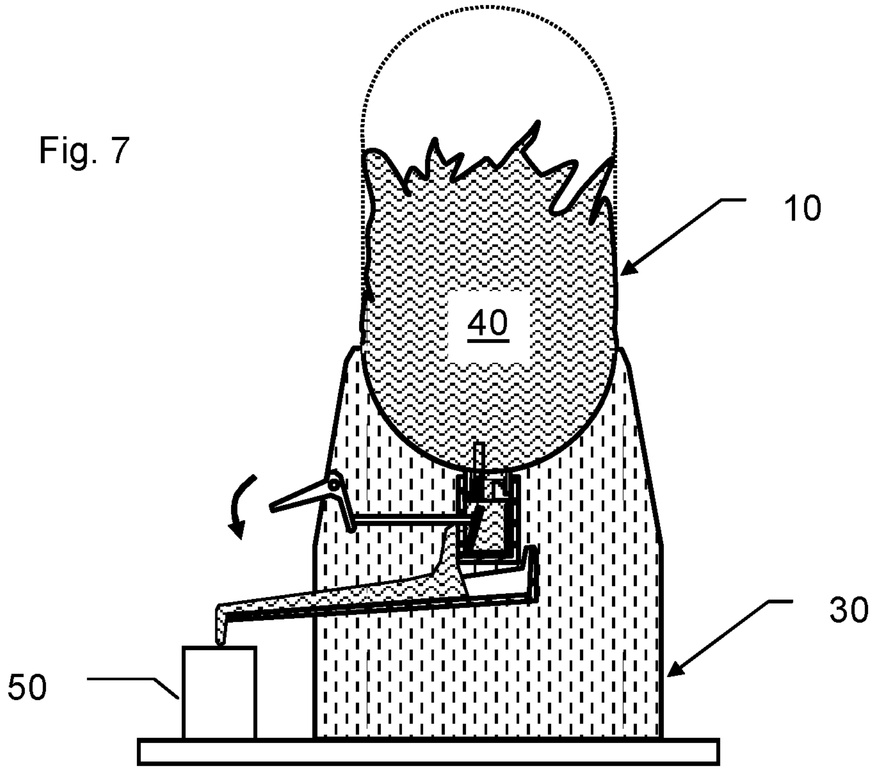

FIG. 7 illustrate a further stage of dispensing liquid. As shown, the lever 34 is actuated by the user, and liquid 40 is drained out of the container 10. Approximately one third of the liquid reference volume has been already dispensed in several sequences. However, and as shown FIG. 7, still no or very limited quantity of air has been allowed to enter the container 10, so that the actual container volume is approximately equal to the actual liquid volume inside container 10. It should be noted that no air bubbles are present in liquid 40, as the container 10 continues to deform to fully or almost fully compensate the loss of liquid 40.

However, at a given deformation of the container 10, the latter cannot further deform enough to fully compensate a loss of liquid 40 during a dispensing phase. This situation is shown on FIG. 8, where during a dispensing phase, liquid 40 is drained out of the container 10, and air is allowed to enter the container 10. In detail, as the container 10 has significantly collapsed, its own resistance increases or prevents further collapse, and air can pass through the second inlet 23B while liquid 40 can pass through the first inlet 23A, as the depression inside the container and its own resistance are unable to compete with atmospheric pressure. During such phase, the air entry into the container is allowed, based on the below factors:

- the liquid pressure inside the container 10 together with the container own resistance is lower than atmospheric pressure, and/or,
- the liquid flow through the valve 20 is low, thereby causing a low pressure drop at the valve area, allowing air to overcome the liquid stream.

Figure 8:
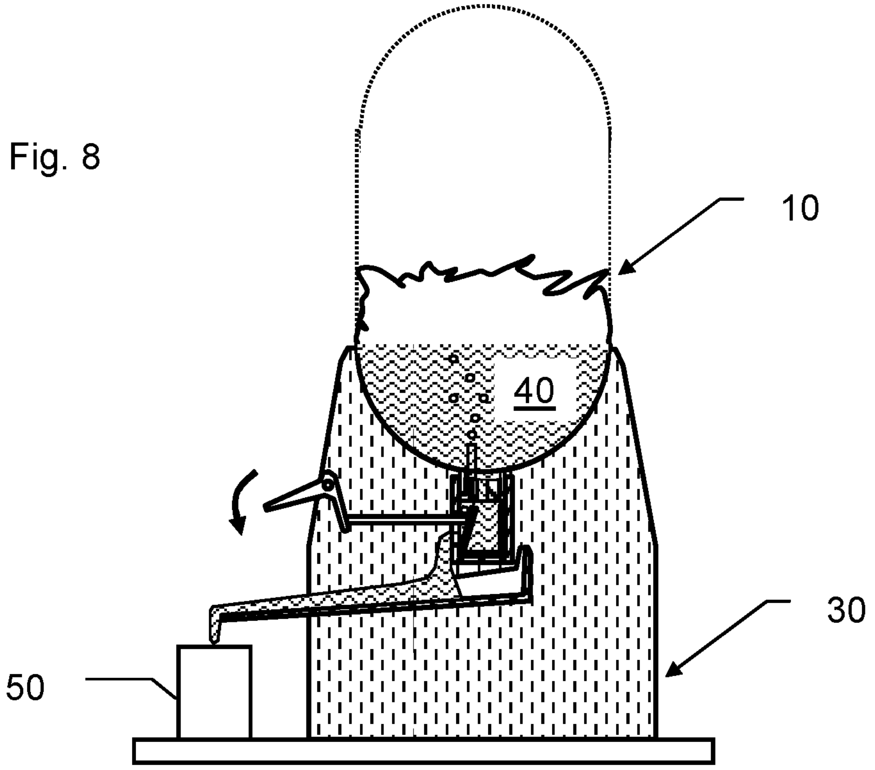

In summary, there is:

- a first dispensing phase during which a volume of liquid 40 can be drained out of the container 10 with no or very limited entry of air: the container 10 deforms to fully compensate the loss of liquid 40 (FIGS. 6 and 7),
- a second dispensing phase, during which a volume of liquid 40 can be drained out of the container 10 with entry of air: the container 10 deforms less or not, so that this low or no deformation does not fully compensate the loss of liquid 40 (FIG. 8).

Figure 9:
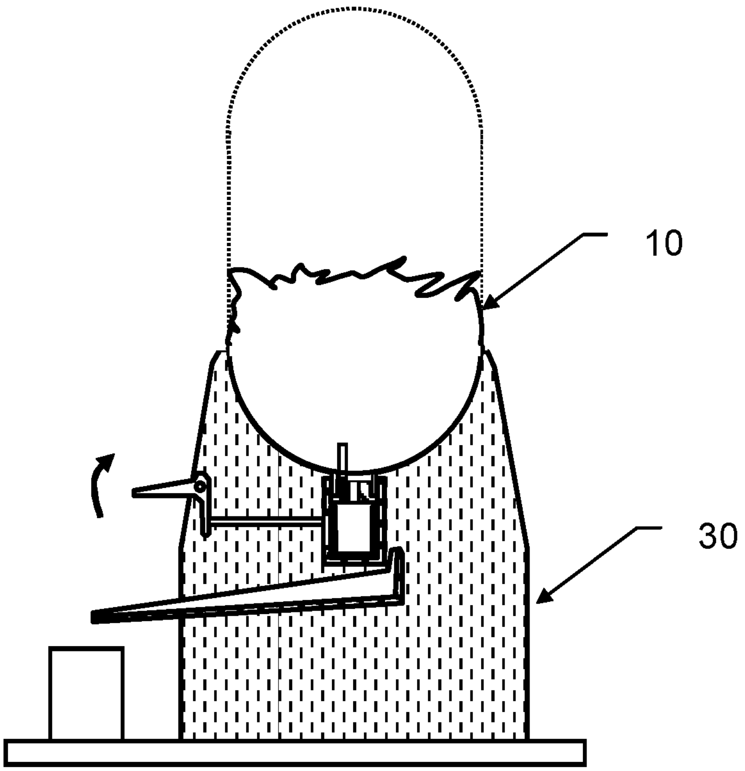
Figure 10:
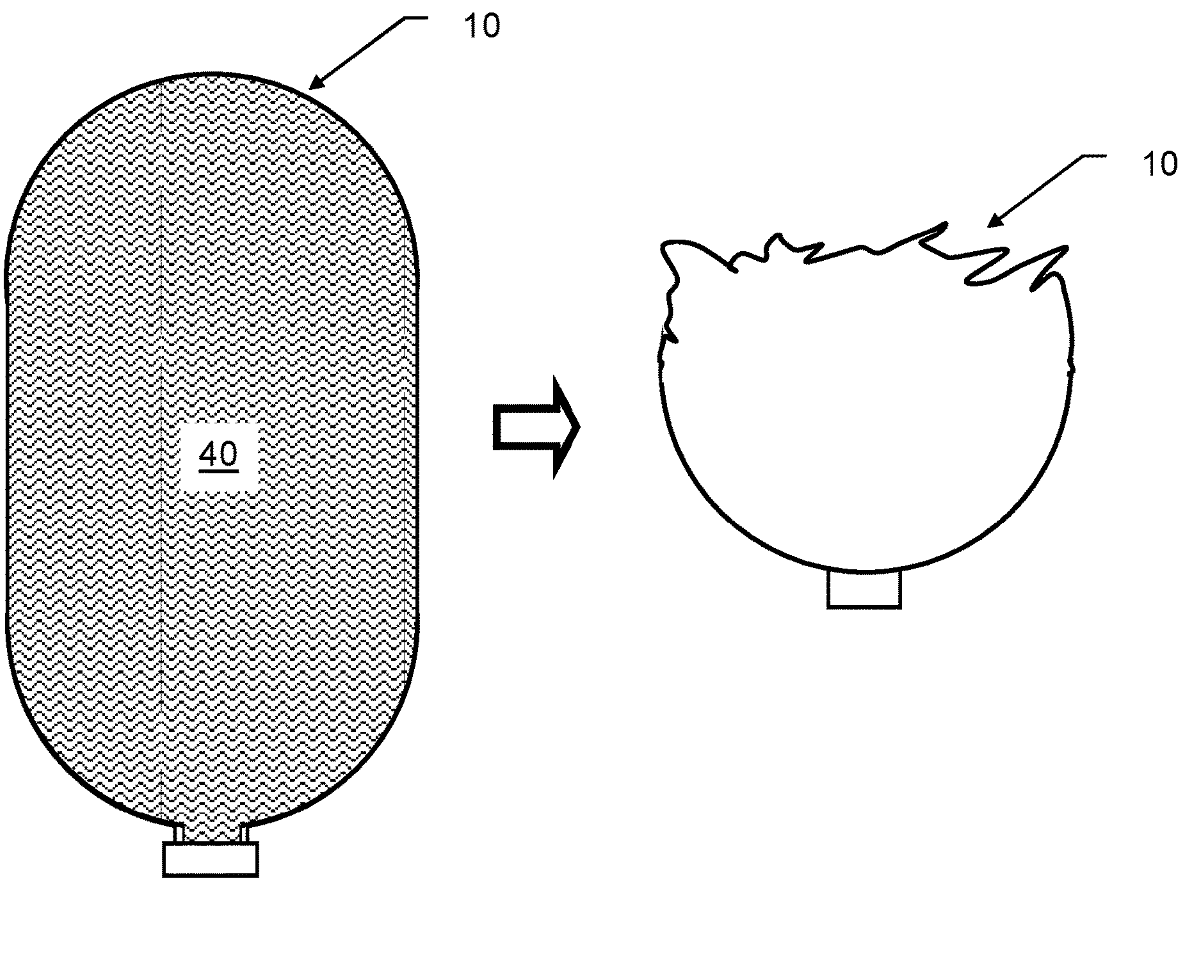
FIG. 10 represents the container of FIG. 1, filled of liquid, on the left side of figure, and empty on the right side of figure.

Finally, as shown FIG. 9, the entry of air into the container 10 allows a full draining of the latter, so that there is no waste of liquid 40, and this also facilitates handling of the container 10 after use. As shown FIG. 10, the empty container 10 on right side is fully empty and partially collapsed, compared to a container 10 full of liquid 40, on the left side. The partial collapse greatly facilitates discarding and recycling the empty containers. In summary, the container 10 is fully emptied, meaning that less than 1% and even less than 0.5% of initial liquid volume remains in the container.

As briefly stated above, the dispenser 30 might also comprise an electronic unit 35, and in particular a liquid content measurement unit which might be a weighting unit to measure a content of liquid 40 into the container 10.

Indeed, a scale is provided for example in the bottom part of dispenser 30, so that it can weight the dispenser 30 alone or not, and the container 10 when installed, so that the tare might be deducted. When the container 10 is installed, the liquid content measurement unit can follow accurately the dispensing of liquid, and several possibilities are then offered:

- the electronic unit 35 can store an history of use, with all the dispensing phases for one container, the initial weight, the final weight,
- the electronic unit 35 can determine the amount of liquid dispensed per dispensing phase (size of cup 50, full, half filled), the frequency of use, the period of time between two dispensing phases.

All the above data can be computed to follow up the container use, the user habits.

If the dispenser 30 is equipped with a screen 36 or display, the electronic unit 35 can send messages to the user, in relation to its use, and also to the status of the container 10. Indeed, if a freshness time or recommended liquid consumption expiration threshold is exceeded since installation of a container 10, the user is informed that it is wise to change the container 10. In addition, if a gas in container time or recommended liquid consumption expiration threshold, counted from a given weight (air/gas entry threshold typically) or a from flow rates, the user is informed that it is wise to change the container 10. Finally, when the weight of container 10 is approaching zero, the user might also be invited to place an order to purchase a new container 10, and/or to stop the consumption of the current container.

In summary, there might be two distinct freshness times: one first is counted from the very beginning of installation of container, and one other might be counted only when air is allowed to enter into the container. Typically, the second freshness time is shorter, as some air has entered the container.

In addition, the dispenser might also comprise a communication unit, to provide exchange of data between a remote server (via radio waves, internet, . . . ) or to a portable device, such as a smartphone or watch of the user. Consequently, automatic orders can be sent to a remote server when the container 10 is almost empty, or reminders might be sent to the telephone of the user.

Also, the dispenser 30 might be equipped with a container presence sensor, or a container kind recognition sensor, which can detect the presence of the container or even the kind of container, to then authorize the dispensing of liquid 40, or allow provision of any of the above functions (use follow up, messages to the user, communication to remote sever or apparatus . . . ).

Figure 11:
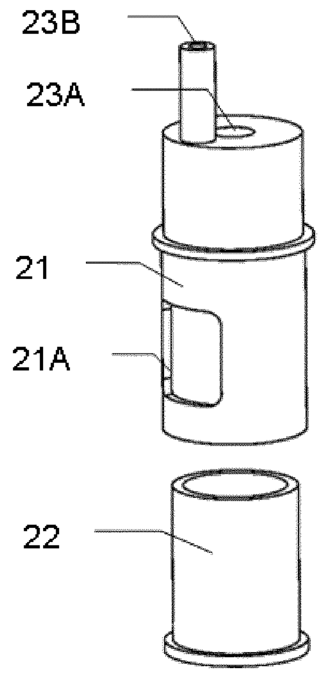
FIGS. 11 to 13 show in detail the valve shown on FIGS. 3-9.

FIG. 11 shows the valve of FIGS. 3 to 9 in an exploded perspective view as disassembled in itself and from the container or during/before assembly of itself and to the container with its dispense/discharge opening/outlet 21A facing to the left in its non-dispensing mode, i.e. closed.

Figure 12:
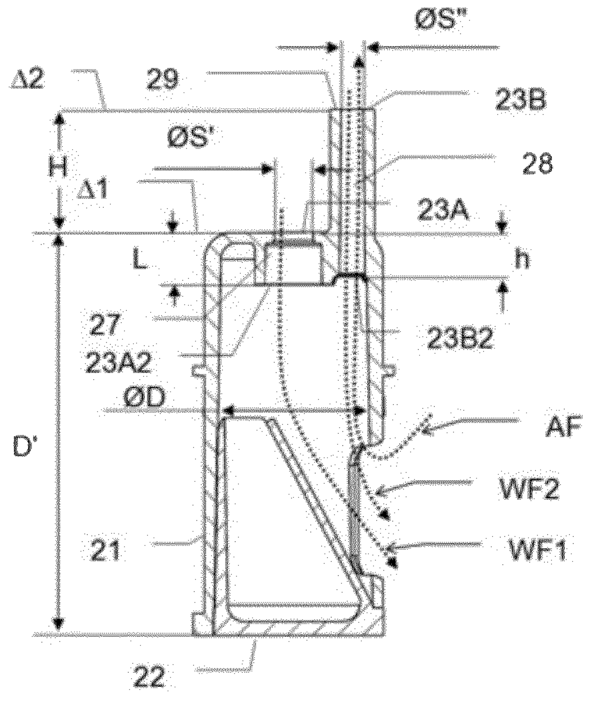

FIG. 12 shows a cross section of the valve of FIGS. 3 to 9 in a dispensing mode, i.e. open for dispense/discharge of the liquid substance or beverage therefrom.

Figure 13:
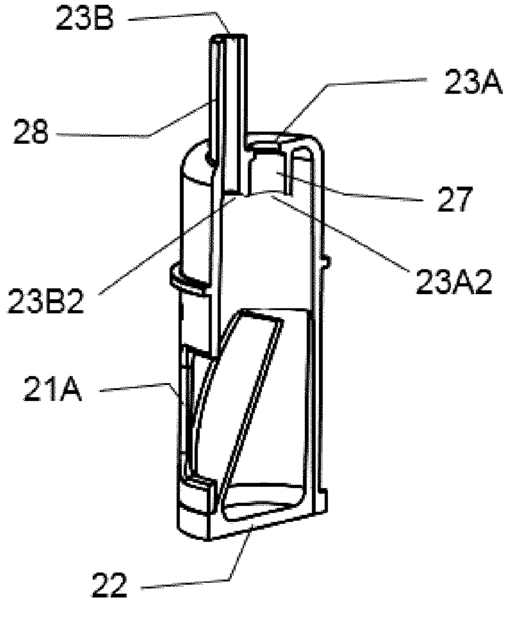

FIG. 13 shows the valve of FIGS. 3 to 9 in perspective assembled in itself but not to the container or during/before assembly to the container with its dispense/discharge opening/outlet 21A facing to the left in its full dispense mode/ fully open.

As shown in FIGS. 11-13, the flexible member or elastic cup 22 is configured to be introduced into or taken out of the valve housing 21 at one of its ends. Flexible member 22 detachably seals this valve housing end as a plug or lid when assembled thereto. One should note that such a detachable elastic cup 22 provides easy dismantling in order to easily and completely clean all the components of the valve 20.

The container 10 is made of a material with the ability to change shape or at least partly collapse when the water 40 is discharged by opening the valve 20, whereby water 40 flows out as a water flow WF by means of gravity while air as an air flow AF is let in to the container 10, see FIG. 12. The valve housing 21 comprises two openings or inlets 23A, 23B for the water flow WF at its top end. At least one of those upper inlets 23A, 23B is configured to let in the airflow AF into the container 10. The valve housing 21 comprises at least one other opening or outlet 21A at and through its side. The container 10 is made of a plastic material with barrier properties, which guarantee that the water 40 can be stored in the container airtight and for a long period of time at room temperature without risk of bacterial effects. The plastic material from which the container 10 is made is in the form of a plastic foil with special properties, such as PET or the like plastic material fulfilling food product storage demands, while being sufficiently stiff but pliable to require exchanging container content against air when dispensing the liquid substance 40.

The flexible member 22 is configured to seal against the inside of the valve housing 21 when assembled therein and to abut against an inner seat of the valve housing around the inside or inner rim of its opening 21A. The flexible member 22 is therefore partly exposed with a part through the fenestrated valve housing 21. This flexible member part is accessible from the outside of the valve housing 21. The valve 20 is adapted to be opened by applying an external pressure P onto the exposed flexible member part 21 as shown in FIGS. 5-9.

As shown FIG. 12, the first inlet 23A forms a first orifice of a first channel 27 with a through hole extending into the valve housing 21 to let one part flow WF1 of water 40 flow into the valve housing. The second water inlet 23B of the valve 20 forms a first orifice of a second channel 28 with a through hole extending into the valve housing 21 to let one part flow WF2 of water flow 40 into the valve housing.

The above effect might be achieved by the following features of the valve 20 and/or further improved by the following features of the valve. In the valve 20 according to any of the above aspects/embodiments, the second water inlet 23B is configured as a first free orifice of the external hollow channel 28 protruding axially from the first valve-housing end. This external hollow channel 28 is formed by an external hollow protrusion 29 extending outwards away from the valve housing end similar to a chimney ending in the second water inlet 23B at a distance H from the first valve-housing end. This outer distance H is measured along/ in parallel with the centre axis longitudinal axis of the valve housing 21. The external hollow channel 28 is provided with a second orifice 23B2 at the other end opposite its free end with its outer inlet 23B. By providing the external hollow protrusion 29 and its inner channel 28 with the first outer orifice or water inlet 23B at this distance H or length extending in a direction being substantially perpendicular or perpendicular to this first valve housing end adapted to be in liquid communication with the water content of the container, this enables water 40 to flow from the second water inlet 23B through the external hollow protrusion 29 (firstly through its free orifice/inlet 23B and further through the inner channel 28 and out of the second orifice 23B2) into the valve housing 21 and its inner passageway and past the flexible member 22 and out of the at least one outlet 21A via the inner passageway and the flexible member 22 when the flexible member is in a flexed shape, this being shown in FIG. 12.

The valve 20 according to the invention might be configured to optimise the water flow by increasing or decreasing its first/outer height or length H of the through hole of its second inner channel 28. It is possible to further improve this optimisation by increasing or decreasing the corresponding second/inner height or length h of the through hole of the second inner channel 28. This optimisation of the two separate heights/lengths h, H and inner endings of the first and second inner channels 27 and 28 separately or in relation to each other enables further improvement of the effect of the air flow and control of the air flow AF, i.e. the letting in of air AF into the container 10 is easier, quicker, smoother, i.e. with no or much less or much smaller air bubbles incurring no or almost no vibrations, making the dispensing much quieter, even silent/noiseless, and more reliably achieved when exchanging water 40 in the container with air during dispense/discharge.

One optimisation and design of the valve 20 concern that the inner channel 27 and its outer inlet 23A is placed closer to the outlet 21A or below the outer inlet 23B of the outer or upper channel 28, i.e. the outer inlet 23A and outer inlet 23B are preferably not in level or flush with each other or end at the same height in the vertical direction relative the valve housing 21. This is visualised for the lower or first water inlet 23A at its level $\Delta_1$ relative the upper or second water inlet 23B at its level $\Delta_2$ on FIG. 12. The levels $\Delta_1$ and $\Delta_2$ on FIG. 12 show that the level or pillar of water above the first inlet 23A is larger or higher or longer than the level or pillar of water above the second inlet 23B, therefore the incurred water pressure on the second inlet 23B is less than on the first inlet 23A.

This design of the valve 20 enables starting to let in any air flow AF as late as possible in the dispensing process to minimise the amount of air let into the container 10 and also the time of airing and adding of oxygen/oxygenation into the water 40.

Any air flow AF follows the path or "line of least resistance" meaning that the second inlet 23B is the most favourable "way" for incoming air as it is placed "higher up" at its level Δ2 with a shorter pillar or "roof" of water 40 to "penetrate" compared to the one above the level Δ1 of the first inlet 23A.

This layout of the valve 20 means that air flow AF is starting being "sucked in" when the pressure or negative pressure inside the container 10 has reached a sufficient or certain level or value below the outer pressure or the pressure outside the container.

EXAMPLES

Example 1

A rPET container of 5.0 L of water (reference volume) is implemented.

Figure 14:
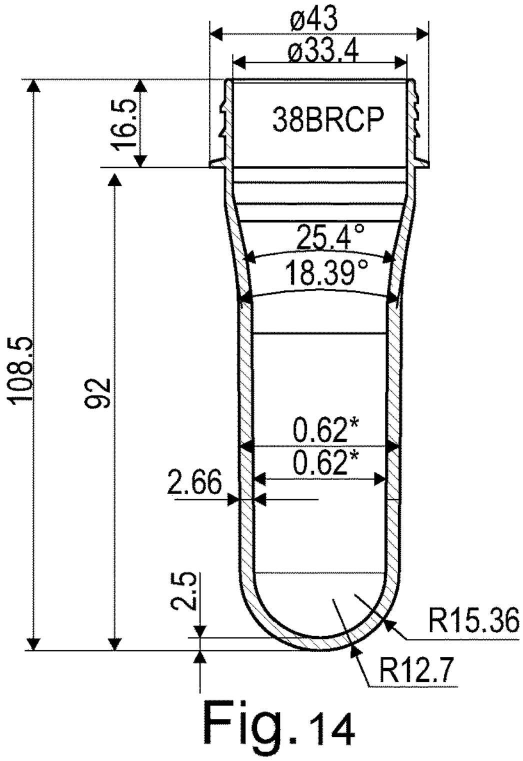
FIG. 14 represents an appropriate PET preform of 32 g, for forming a 5 L container. Dimensions are in mm.
Figure 15:
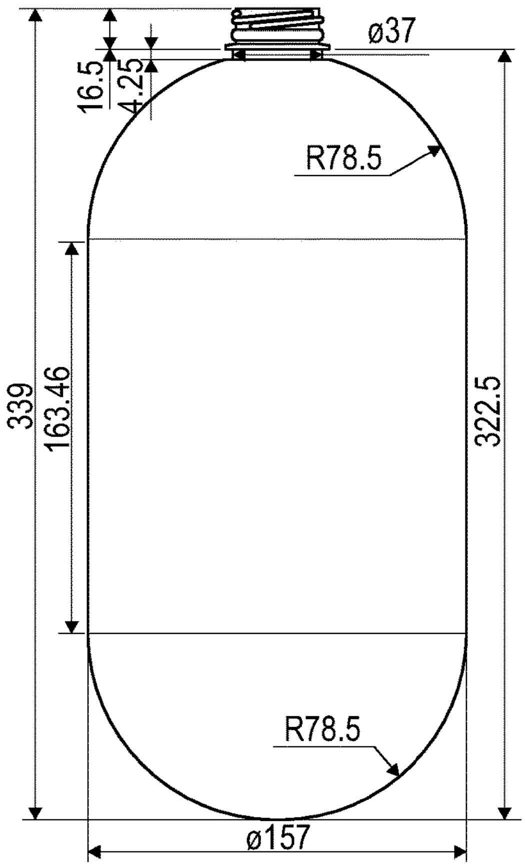
FIG. 15 represents an appropriate PET 5 L container of 32 g, formed from the preform of FIG. 14. Dimensions are in mm.

The container is prepared by Injection Stretch Blow Molding the preform represented on FIG. 14, where dimensions are in mm, to obtain the container represented on FIG. 15, where dimensions are in mm. The main parameters and features are reported on table 1.1 below. The container is filled with 5.0 L of water, and sealed with a screw cap.

TABLE 1.1

| | |
|---|---|
| Material and weight (Preform weight) | 32 g rPET |
| Weight under Neck (g) | 27.49 |
| Preform body external diameter (mm) | 31.32 |
| Preform body internal diameter (mm) | 26 |
| Preform body thickness (mm) | 2.66 |
| Preform length under neck (mm) | 92 |
| Container diameter (mm) | 157.0 |
| Container length under neck (mm) | 322.5 |
| Shoulder curve radius (mm) | 78.5 |
| Bottom curve radius (mm) | 78.5 |
| Container Reference (cm3) | 5191 |
| Container Surface under neck ($cm^2$) | 1576.96 |
| Axial stretch ratio | 3.57 |
| Hoop stretch ratio | 5 |
| Planar stretch ratio | 17.85 |
| Thickness at shoulder (μm) | 167 |
| Thickness at sidewall (μm) | 89.5 |
| Thickness at bottom (μm) | 167 |
| g/m2 under neck | 161.83 $g/m^2$ |
| Packaging efficacy (g/L) | 6.4 |
| Blowing Equipment type | One blow |
| Preform blowing temperature | 85° C. |
| Blowing pressures | 8 bars pre-blow<br>30 bars blow |
| Blowing time (s) | 1.7 |
| Mold Temperature | 25° C. |

After unsealing the container is coupled with the valve represented on FIGS. 11 to 13. Referring to FIG. 12, the dimensions are reported on table 1.2 below.

TABLE 1.2

| | |
|---|---|
| D: Internal Diameter of the housing (mm) | 28 mm |
| D': Length of the housing (mm) | 68 mm |
| First channel diameter S' (mm) | 8 mm |
| Second channel diameter S" (mm) | 4 mm |
| Protrusion height H (mm) | 22 mm |
| height h (mm) | 4.5 mm |
| Length L (mm) | 31 mm |

Upon use the system:

- a first dispensing phase during which liquid 40 is drained and no air enters the container 10, the latter deforming to compensate the outflow, this phase
- a second dispensing phase during which liquid 40 is drained and some air enters the container 10, The water flow rates are evaluated and reported on table 1.3 below:

TABLE 1.3

| | Volume drained out of the container | | | | | |
|---|---|---|---|---|---|---|
| | 0-1 L | 1-2 L | 2-3 L | 3-4 L | 4-5 L | 0-5 L |
| Volume in the container | 100%-80% | 80%-60% | 60%-40% | 40%-20% | 20%-0% | 100%-0% |
| Observations | First phase Container deformation, no air bubbles | First Phase Container deformation, no air bubbles | First Phase Container deformation, no air bubbles | Second Phase starts Air bubbles, low container deformations | Second Phase Air bubbles, low container deformations | First Phase then Second Phase as mentioned on left. |
| Average water flow (L/s) | 0.111 | 0.103 | 0.073 | 0.040 | 0.036 | 0.059 |

A full drainage of the water out of the container is achieved.

Example 2

A rPET container of 5.0 L of water (reference volume) is implemented.

Figure 16:
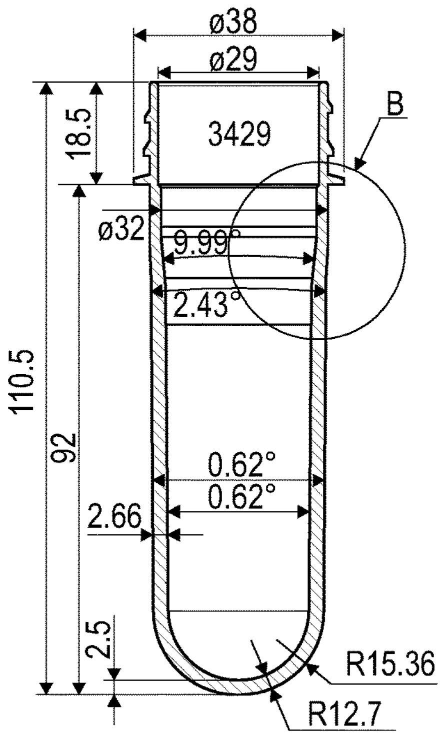
FIG. 16 represents another appropriate PET preform of 32 g, for forming a 5 L container. Dimensions are in mm.
Figure 17:
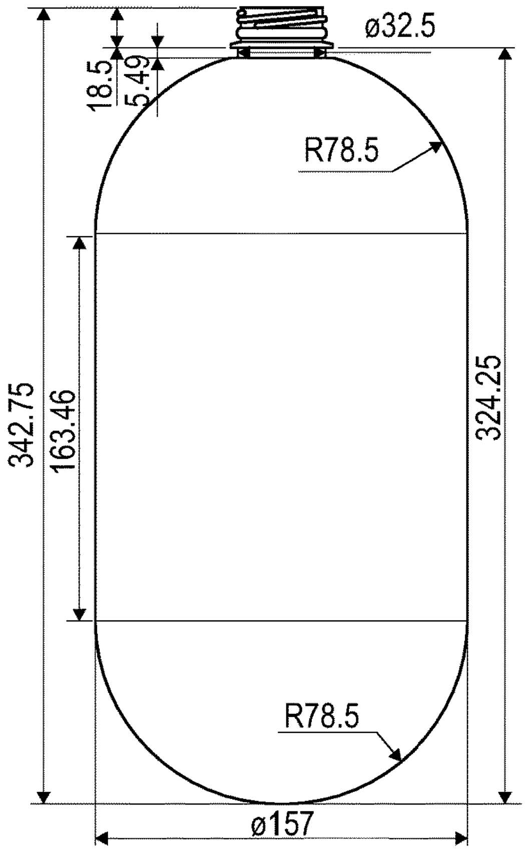
FIG. 17 represents an appropriate PET 5 L container of 32 g, formed from the preform of FIG. 16. Dimensions are in mm.

The container is prepared by Injection Stretch Blow Molding the preform represented on FIG. 16, where dimensions are in mm, to obtain the container represented on FIG. 17, where dimensions are in mm. The main parameters and features are reported on table 2.1 below. The container is filled with 5.0 L of water, and sealed with a screw cap.

TABLE 2.1

| | |
|---|---|
| Preform Material | rPET - EcoPet CB 0C 78 supplied by FPR |
| Preform weight (g) | 32 |
| Preform neck type: diameter including threads - internal diameter (mm) | 34-29 |
| Weight under Neck (g) | 27.36 |
| Preform body external diameter (mm) | 31.02 |
| Preform body internal diameter (mm) | 25.7 |
| Preform body thickness (mm) | 2.66 |
| Preform length under neck (mm) | 92 |
| Container diameter (mm) | 157.0 |
| Container length under neck (mm) | 324.25 |
| Shoulder curve radius (mm) | 78.5 |
| Bottom curve radius (mm) | 78.5 |
| Container Reference (cm3) | 5177 |
| Container Surface under neck ($cm^2$) | 1613 |
| Axial stretch ratio | 3.52 |

TABLE 2.1-continued

| | |
|---|---|
| Hoop stretch ratio | 5.06 |
| Planar stretch ratio | 17.81 |
| Thickness at shoulder (μm) | 155 |
| Thickness at sidewall (μm) | 100 |
| Thickness at bottom (μm) | 155 |
| g/m2 under neck | 169.62 |
| Packaging efficacy (g/L) | 6.4 |
| Blowing Equipment type | 1 blow |
| Preform blowing temperature | 85° C. |
| Blowing pressures | 8 bars pre-blow<br>30 bars blow |
| Blowing time (s) | 1.7 |
| Mold Temperature | 15° C. |

The container according to example 2, with details listed in table 2.1 can be coupled to a valve similar to the one depicted in FIGS. 11-13 for dispensing water with:

a first dispensing phase during which liquid is drained and no air enters the container, the latter deforming to compensate the outflow, a second dispensing phase during which liquid is drained and some air enters the container.

In addition, some adjustments might be made on the valve/container interface to propose specific neck diameter/coupling system/sealing solution. In such case, the valve dimensions shall be adjusted accordingly (at least the dimensions of the portion to be inserted into the container). As an example, adjusting the external diameter of the valve to fit a specific container neck aperture might require to adjust slightly the dimensions of the rest of the valve, to still ensure dispensing the liquid with two sequential phases (first dispensing phase with only liquid draining, and second phase with liquid draining+air entry). In particular, the first channel diameter S', second channel diameter S", protrusion height H, height h, length L might need to be adjusted.

It is of course understood that obvious improvements and/or modifications for one skilled in the art may be implemented, still being under the scope of the invention as it is defined by the appended claims.

The invention claimed is:

1. System for dispensing a liquid to a user, comprising:

a container having a reference container volume, a liquid, in the container, said liquid being in an amount of up to a liquid reference volume, the liquid reference volume being at least 80% of the container reference volume, a dispenser, arranged to receive and hold the container in a dispensing position, and comprising a controller to be actuated by the user, a valve connected to the container, and connected to the controller to selectively release or stop a flow of the liquid out of the container, characterized in that:

upon releasing at least a part of the liquid, the container is deformable, the valve releasing a flow of the liquid out of the container when the controller is actuated by the user, and upon releasing at least another part of the liquid, the valve releases a flow of liquid out of the container, and allows a flow of gas into the container when the controller is actuated by the user.

2. The system according to claim 1, wherein:

during a first dispensing phase, the container is deformable so that the valve only releases a flow of liquid out of the container when the controller is actuated by the user;

during a second dispensing phase, the valve releases a flow of liquid out of the container, and allows a flow of gas into the container when the controller is actuated by the user.

3. The system according to claim 1, wherein the container comprises a wall comprising a bottom portion, a side portion, and a shoulder portion, and a neck provided on the shoulder portion opposite to the bottom portion, wherein the side portion comprises a straight part.

4. The system according to claim 3, wherein the bottom portion and/or the shoulder portion present a hemispherical shape, and wherein the side portion is cylindrical.

5. The system according to claim 3, wherein the wall is free of ridge, rib, or groove.

6. The system according to claim 1, wherein the valve is arranged to allow a flow of out of the container of from 0.020 L/s to less than 0.150 L/s, as an average for fully draining the liquid out of the container.

7. The system according to claim 1, wherein the container is made of polyethylene terephthalate (PET).

8. The system according to claim 1, wherein the container has a ratio between its weight and its reference volume of from 5.27 g/L to 9.33 g/L.

9. The system according to claim 1, wherein the container reference volume is of at least 3.0 L.

10. The system according to claim 1, wherein the container, when filled with the liquid reference volume and sealed presents at top load resistance of at least 10 daN for at least 5 mm deformation and/or a lateral load resistance of at least 5 daN for at least 2.5 mm deformation.

11. The system according to claim 1, wherein when the liquid occupies a liquid volume comprised in a range of an air entry threshold to 100% of the liquid reference volume, the valve is arranged to only release, in a first dispensing phase, a flow of liquid out of the container when the controller is actuated by the user; and when the liquid occupies a liquid volume comprised in a range of from 0% to an air entry threshold of the liquid reference volume, the valve is arranged to release, in a second dispensing phase, a flow of liquid out of the container, and to allow a flow of gas into the container when the controller is actuated by the user, wherein the air entry threshold is comprised between 5% and 66% of the liquid reference volume.

12. The system according to claim 1, wherein:

the container comprises a wall comprising a bottom portion, a side portion, and a shoulder portion, and a neck provided on the shoulder portion opposite to the bottom portion, the dispenser comprises a receiving portion arranged to mate with the shoulder portion so as to stably receive and hold the container in a dispensing position, and wherein the bottom portion has a similar shape to the shoulder portion so that the receiving portion can stably receive and hold the container in an upright position.

13. The system according to claim 1, further comprising an electronic control unit, arranged to display or send at least one information or instruction message to the user.

14. The system according to claim 13, further comprising a liquid content measurement unit.

15. The system according to claim 13, comprising:

a clock connected to the electronic control unit, a container presence sensor, and wherein the message is a reminder to change the container, or an order for a new filled container, when a period of time, started when the container presence sensor has changed of state to detect installation of a container, is exceeding a freshness time threshold.

16. The system according to claim 13, wherein the message is a reminder to change the container, when a second period of time, started when the container weight has been measured below a weight threshold, is exceeding a gas in container time threshold.

17. The system according to claim 13, comprising at least one container kind recognition sensor, and wherein the electronic control unit is arranged to inhibit the sending of any message, if the container kind recognition sensor fails to recognize an authorized kind of container.

18. Method for dispensing a liquid with a system according to claim 1, comprising the steps of:

providing the sealed container having the container reference volume and filled with the liquid at the liquid reference volume being at least 80% of the container reference volume, breaking the seal of the container, connecting the valve to the container, coupling the container equipped with the valve to the dispenser, so as to connect the valve to a controller of the dispenser.

19. Method according to claim 18, further comprising the steps of:

actuating the controller so as to selectively release or stop a flow of the liquid out of the container, and upon releasing at least a part of the liquid, deforming the container, so that the valve releases a flow of the liquid out of the container when the controller is actuated by the user, and upon releasing at least another part of the liquid, the valve releases a flow of liquid out of the container, and allows a flow of gas into the container when the controller is actuated by the user.

* * * * *